May 19, 1925.

J. H. HOPPER ET AL

SHOCK ABSORBER

Filed Jan. 15, 1924

1,538,188

INVENTORS
E. O. Hugg,
BY J. H. Hopper.
Geo. F. Kimmel
ATTORNEY.

Patented May 19, 1925.

1,538,188

UNITED STATES PATENT OFFICE.

JOHN H. HOPPER AND ERNEST O. HUGG, OF JONESBORO, ARKANSAS, ASSIGNORS OF ONE-FOURTH TO SAID HUGG, ONE-FOURTH TO GEORGE L. MINTON, AND ONE-HALF TO JOHN B. HINSON, ALL OF JONESBORO, ARKANSAS.

SHOCK ABSORBER.

Application filed January 15, 1924. Serial No. 686,456.

*To all whom it may concern:*

Be it known that we, JOHN H. HOPPER and ERNEST O. HUGG, citizens of the United States, residing at Jonesboro, in the county of Craighead and State of Arkansas, have invented certain new and useful Improvements in Shock Absorbers, of which the following is a specification.

This invention relates to a shock absorber, primarily designed for use in connection with motor vehicles, but it is to be understood that a shock absorber in accordance with this invention can be employed for any purposes for which it is found applicable, and the invention has for its object to provide, in a manner as hereinafter set forth, a novel, simple and durable shock absorber to prevent violent rebound or upward snap of the vehicle spring on the recoil after flexure, under such conditions obtaining easy riding qualities when the vehicle is travelling over an uneven road surface.

Further objects of the invention are to provide, in a manner as hereinafter set forth, a shock absorber which is simple in its construction and arrangement, strong, durable, compact and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

The adaptation of the invention is shown in connection with a rear vehicle spring, but it is to be understood that the shock absorbing element can be utilized in connection with any form of front or rear spring for which the element is found applicable.

Figure 1:
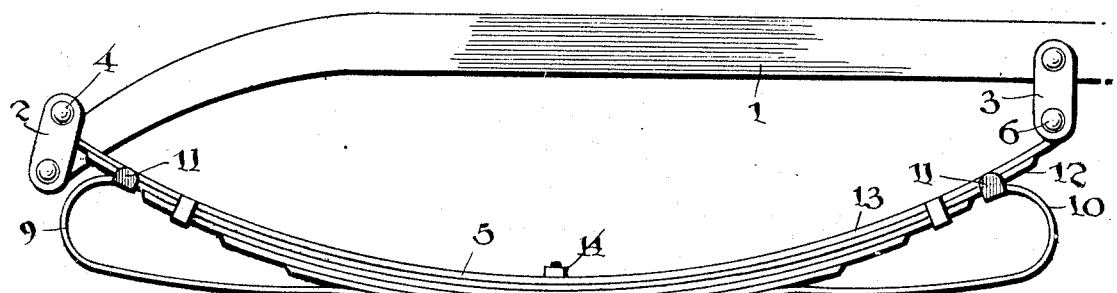
Figure 1 is an elevation of one form of a rear vehicle spring, showing the adaptation therewith of a shock absorber in accordance with this invention.

Referring to Figure 1 of the drawing, 1 denotes a portion of the chassis or frame of a vehicle, and which has pivotally connected therewith a pair of hanger elements 2, 3, and to the former is connected, as at 4, one end of a semi-elliptic spring 5, of the leaf type. The other end of the spring 5 is connected to the element 3, as at 6.

Figure 2:
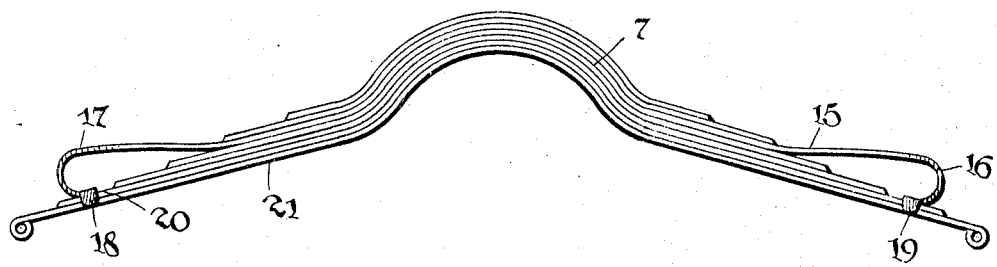
Figure 2 is a similar view of another form of rear vehicle spring, showing the adaptation therewith of a shock absorber in accordance with this invention.

Referring to Figure 2 of the drawing, 7 denotes a spring of the leaf type, of a different form than that shown in Figure 1.

The spring 5, as well as the spring 7, is of well known form, and each of said springs has one of its intermediate leaves or sections extended and with each end terminal portion semi-circular in contour and slidably connected with an elongated leaf or section.

In Figure 1, that leaf or section of the spring 5, which is extended, is indicated at 8, and the semi-circular end terminal portions thereof are indicated at 9, 10. The terminal portion 9, as well as the terminal portion 10, is provided with a yoke 11, which straddles the end terminal portions of the leaf or section 12 of the spring 5, which abuts against the inner leaf or section 13, connected with the elements 2 and 3. The leaves or sections of the spring 5 are connected together at the center thereof, by a hold-fast device 14.

In Figure 2, that leaf or section of the spring 7, which is extended, is indicated by the reference character 15, and the semi-circular terminal portions of said leaf or section 15 are indicated at 16 and 17. The terminal portion 17 is provided with a yoke 18, and the terminal portion 16 with a yoke 19. The yokes 18 and 19 are slidably mounted on that leaf 20 of the spring 7 which abuts against the leaf 21 of the spring 7. The leaf 21 is that leaf which is connected with the vehicle body or frame.

The leaf or section 8 of the spring 5 is of greater length than any other of the leaves or sections thereof, that is to say when the leaf or section 8 is extended. The leaf or section 15 of the spring 7 is of greater length when extended than any other of the leaves or sections of the spring 7.

Figure 3:
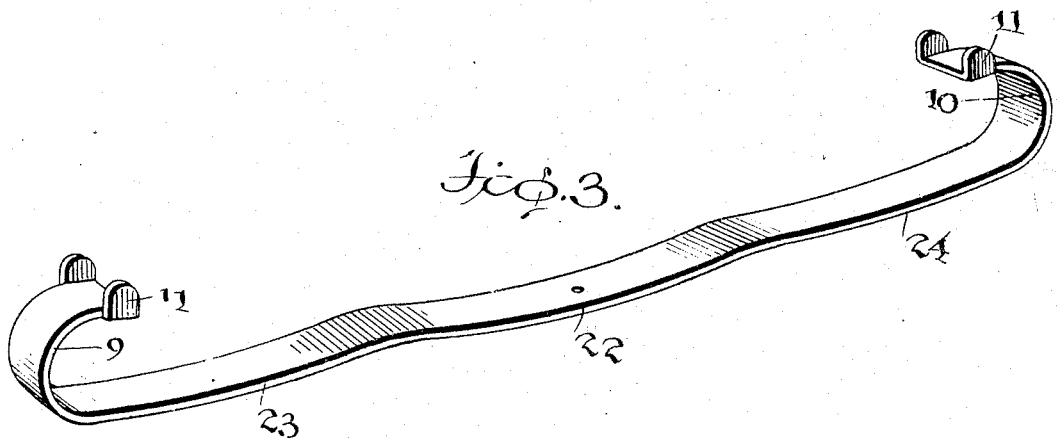
Figure 3 is a perspective view of the shock absorber, in accordance with this invention.

Figure 3 of the drawings illustrates the leaf or section 10 in itself, and which is formed with a segmental intermediate portion 22 and a pair of curved outer portions 24, which merge into the semi-circular end terminal portions 9, 10, respectively, and these latter are formed integral with the yokes 11.

The leaf or section 8, or leaf or section 15, acts as a means, due to its slidably mounted semi-circular end terminal portions, to prevent the rebound, due to the sudden recoil of the spring proper, or in other words prevents violent rebound or upward snap of the vehicle spring on the recoil after flexure, and furthermore the said extended leaf or section does not interfere with the normal operation of the spring proper.

What we claim is:—

A vehicle spring comprising a body portion formed from a series of superposed curved abutting leaves, one of the intermediate leaves of said body portion of a greater length than any one of the other leaves thereof, the leaves opposing one face of said intermediate leaf progressively increasing in length towards said face and abutting each other throughout, the leaves opposing the other face of said leaf progressively increasing in length from said face and abutting each other throughout, said leaf projecting laterally to provide end terminal portions having the major part thereof spaced from and opposing the leaves which progressively increase in length therefrom, each of said end terminal portions inturned at its free end to slidably engage another intermediate leaf arranged in proximity to one of the outer leaves of the body portion, and means integral with said inturned free ends and opposing the side edges of a plurality of leaves of the body portion to prevent transverse shifting of said ends.

In testimony whereof, we affix our signatures hereto.

JOHN H. HOPPER.
ERNEST O. HUGG.